(12) United States Patent
Voss et al.

(10) Patent No.: US 6,474,162 B1
(45) Date of Patent: Nov. 5, 2002

(54) MICROMECHANICAL RATE OF ROTATION SENSOR (DRS)

(75) Inventors: Ralf Voss, Starnberg; Karin Bauer, Munich; Matthias Rose, Zorneding; Erwin Stenzel, Deisenhofen; Josef Schalk, Altheim; Winfried Kupke, Ottobrunn; Helmut Seidel, Starnburg, all of (DE)

(73) Assignee: EADS Deutschland GmbH, Munich (DE)

(*) Notice: Subject to any disclaimer, the term of this patent is extended or adjusted under 35 U.S.C. 154(b) by 984 days.

(21) Appl. No.: 09/011,233

(22) PCT Filed: Aug. 2, 1996

(86) PCT No.: PCT/EP96/03412
§ 371 (c)(1),
(2), (4) Date: Feb. 9, 1998

(87) PCT Pub. No.: WO97/06412
PCT Pub. Date: Feb. 20, 1997

(30) Foreign Application Priority Data

Aug. 8, 1995 (DE) ......................................... 195 28 961

(51) Int. Cl.⁷ .................................................. G01P 9/04
(52) U.S. Cl. .................................... 73/504.16; 310/370
(58) Field of Search ........................ 73/504.12, 504.15, 73/504.16, 504.13, 504.14; 310/370

(56) References Cited

U.S. PATENT DOCUMENTS

| 3,017,775 A | 1/1962 | Entin ............................ 73/505 |
| 3,218,850 A | * 11/1965 | Langevin ................. 73/504.15 |
| 3,258,617 A | 6/1966 | Hart ............................ 310/9.8 |

(List continued on next page.)

FOREIGN PATENT DOCUMENTS

| DE | 42 28 795 | 3/1994 |
| DE | 195 28 961 | 2/1997 |
| EP | 0 394 664 | 10/1990 |
| EP | 0 572 976 | 12/1993 |
| EP | 0 574 143 | 12/1993 |
| JP | 60-113105 | 6/1985 |
| JP | 2-218914 | 8/1990 |
| SU | 534 694 | 11/1976 |
| WO | 81/03086 | 10/1981 |
| WO | 93/05400 | 3/1993 |

OTHER PUBLICATIONS

Ralf Voss et al., "Silicon Angular Rate Sensor for Automotive Applications with Piezoelectric Drive and Piezoresistive Read–out", Proc. Transducer 97, Chicago, pp. 879–882, 1997.

Ralf Voss, "Silicon Micromachined Vibrating Gyroscopes", Daimler Benz AG, Research and Technology—A Silicon Tuning Fork, Proceedings SPIE 1997 Symp. of Micromachining and Microfabrication, Austin, Sep. 29–30, 1997.

Y. Kanda, "Hall–Effect Devices as Strain and Pressure Sensors", Sensors and Actuators, 1983, pp. 283–296.

Daimler Benz Forschung und Technik, Mikrosystemtechnik, F2M/M, Stand 12/96.

*Primary Examiner*—Helen Kwok
(74) *Attorney, Agent, or Firm*—Crowell & Moring LLP

(57) ABSTRACT

A rate of rotation sensor is suggested which is structured out of silicon (silicon compounds or silicon/glass compounds) or other semiconductor materials by means of micromechanical techniques. The rate of rotation sensor has the form of a tuning fork whose prongs are situated in planes in parallel to the surface of the semiconductor wafer. These prongs are exited to carry out vibrations in a plane perpendicular to the wafer plane. By means of a sensor element which registers the torsion of the tuning fork suspension, the angular velocity of a rotation of the sensor about an axis in parallel to the tuning fork suspension is measured.

24 Claims, 14 Drawing Sheets

U.S. PATENT DOCUMENTS

| | | | |
|---|---|---|---|
| 4,317,126 A | | 2/1982 | Gragg, Jr. .................... 357/26 |
| 4,429,248 A | * | 1/1984 | Chuang ...................... 310/370 |
| 4,489,609 A | | 12/1984 | Burdess et al. ............... 73/505 |
| 4,598,585 A | | 7/1986 | Boxenhorn .................. 73/505 |
| 4,689,992 A | | 9/1987 | Strachan ..................... 73/505 |
| 4,742,260 A | * | 5/1988 | Shimizu et al. ............. 310/323 |
| 4,750,364 A | * | 6/1988 | Kawamura et al. ...... 73/504.16 |
| 5,488,862 A | | 2/1996 | Neukermans et al. .... 73/504.02 |
| 5,629,790 A | | 5/1997 | Neukermans et al. ....... 359/198 |
| 5,648,618 A | | 7/1997 | Neukermans et al. .... 73/862.08 |
| 5,796,000 A | * | 8/1998 | Fujiu et al. ............... 73/504.15 |

\* cited by examiner

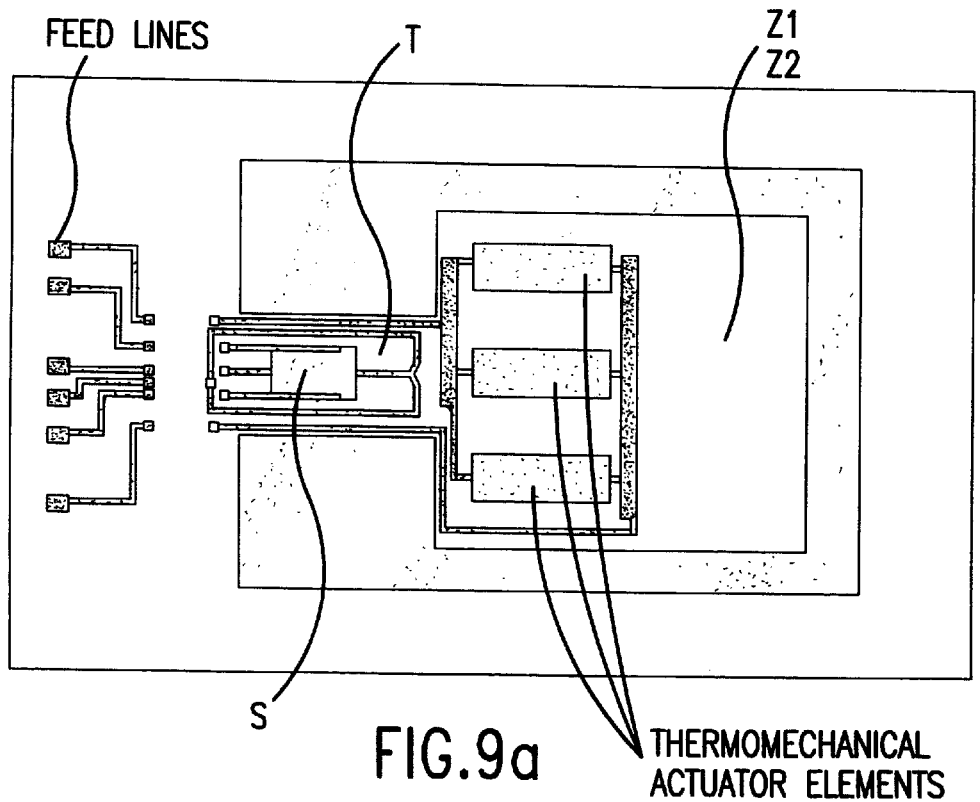
FIG.9a THERMOMECHANICAL ACTUATOR ELEMENTS
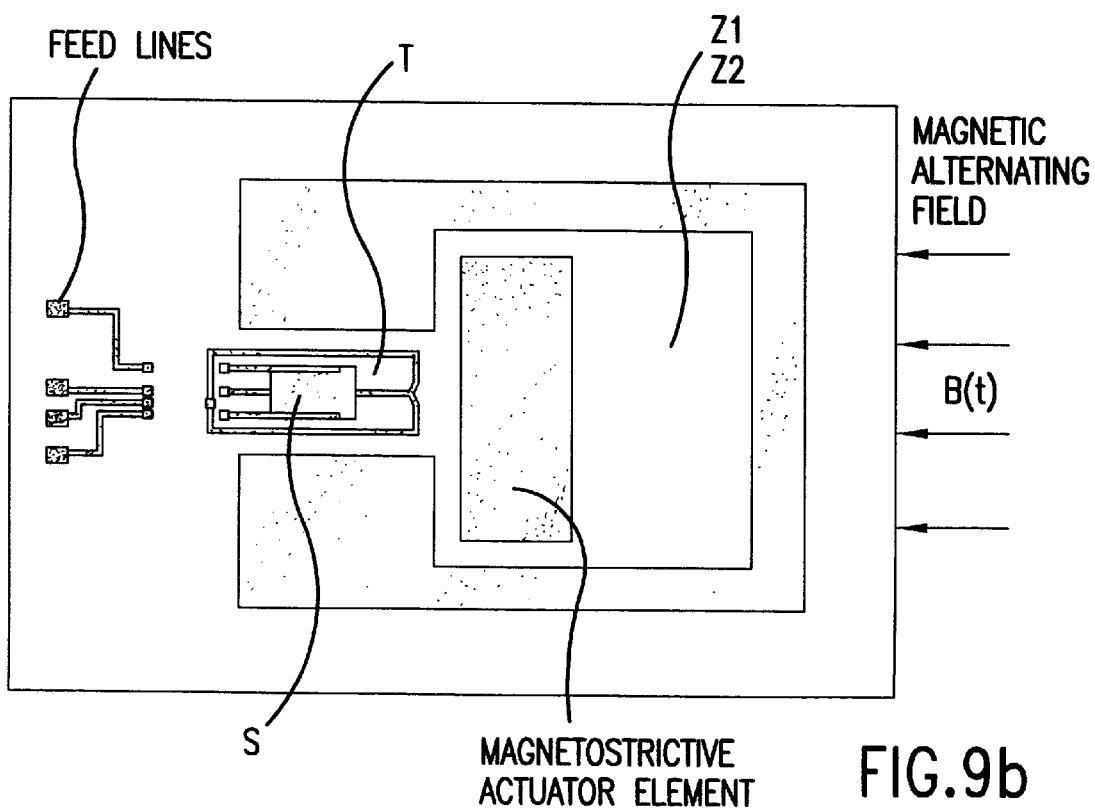
FIG.9b MAGNETOSTRICTIVE ACTUATOR ELEMENT

MICROMECHANICAL RATE OF ROTATION SENSOR (DRS)

BACKGROUND AND SUMMARY OF THE INVENTION

The invention relates to a micromechanical rate of rotation sensor in the case of which parts made of silicon, silicon compounds or silicon/glass compounds or other semiconductor materials are structured out by micromechanical techniques.

The fields of application of such rate of rotation sensors are diverse. Thus, in the field of automotive engineering, the yaw, pitch and roll velocity as the key quantity for driving dynamics control systems (ABS, ADS, ASS, ASR, and others), for navigation systems as a supplement to the GPS as well as for measuring the angular velocity of moved parts of a motor vehicle with respect to one another can be determined. In space operations, such systems can be used as weight- and space-saving inertial components (inertial platform), for stabilizing the focal plane of optical observation instruments of satellites and for measuring and stabilizing (undamped) vibrations of elastic components.

In aviation, the measuring and controlling of the relative movement of different airplane components with respect to one another (adaptive wings) can take place. A use is also possible in the case of the orbit stabilization and navigation of missiles.

In railroad technology, the yaw and roll angle of the cars with individual wheel suspensions (compare Pendolino), thus, the actual value for controlling the optimal curve entering speed can be measured.

In automation technology, robot movements can be monitored and robot components can be controlled.

In general machine construction, such components are useful for vibration measuring (compare Active Vibration Control); particularly for measuring that component of the impedance of vibrating elastic structures which originates from the "rotation part" of the movement. The miniaturization (low weight and low space requirement) is particularly decisive here.

Finally, application possibilities exist, for example, in medical technology for monitoring patients by measuring their movements, for controlling surgical instruments (minimal invasive surgery) and for controlling wheelchairs.

The many application possibilities have already resulted in numerous suggestions with respect to rate of rotation sensors.

In the meantime, various principles for measuring the rate of rotation have also been miniaturized in order to be manufactured at reasonable cost and in order to be usable for applications in video cameras, vehicles or other moved objects. Implementations are known in metal with a piezoelectric actuator system and sensor system, as well as in quartz, in crystalline silicon and in polysilicon.

Thus, systems are described in German Patent Document DE 42 28 795 A1 (Bosch), in European Patent Document EP 05 72 976 A1 (Canon) and in Patent Document WO 93/14409 (Sunstrand) in the case of which one or several acceleration sensor(s) (BS) are mounted on vibrating structures and which measure the Coriolis acceleration occurring when the system rotates. In this case, it is disadvantageous that the rigidity of the structure on which the two sensors are situated cannot be ensured or is very difficult to ensure. In addition, the crosstalk of the excitation movement onto the sensor component cannot be eliminated, particularly if only one acceleration sensor respectively is used for each direction.

German Patent Document DE 35 09 948 A1 (Draper) and European Patent Document EP 0 422 280 A2 (Draper) describe rate of rotation sensors whose geometry is based on a miniaturized cardanic suspension (gimbal). If the overall system is rotated about a suitable axis, a rotary vibration about the suspension of the outer frame is coupled to a rotary vibration about the suspension of the inside frame (and/or vice versa). Here, it is a disadvantage that the indicated three-dimensional geometry for the optimal sensor function requires the generating of mechanically tension-free structures or structures with defined bracing, which is very difficult to implement. For achieving a sufficiently high measuring effect, a special arrangement of the inert mass on the sensor is required. This mass must be arranged symmetrically to an axis perpendicularly to the wafer plane on the cardanic structure. The technological implementation of such a construction presents serious problems; that is, the manufacturing of the sensors in the batch process with the goal of large piece numbers is very cost-intensive.

From Patent Document WO 93/05400 (BEI-Electronics), an electrostatically or electromagnetically excited rate of rotation sensor is known which consists of a disk which carries out small periodic rotating movements in the wafer plane. A rotation of the system about an axis in parallel to the wafer plane causes a tilting of the disk with respect to the movement plane. This tilting is measured by piezoresistive sensors in the four elastic suspensions of the disk. The disadvantages are that this sensor can be manufactured to be mechanically free of tensions only at high expenditures and that the tilting of the disk in a rotated system of coordinates has the effect that the controlling of the capacitive excitation of the periodic rotating movements of the disk results in high expenditures.

European Patent Document EP 0 519 404 A1 (Honda) describes a gas flow sensor according to the anemometer principle in the case of which the effect of a rate of rotation is measured by way of the change of the differential resistance of a pair of conductors. This pair of conductors is situated in the wall of a small Si tube through which gas flows and measures the change of direction of the gas flow on the basis of the Coriolis force. The disadvantages here are that the system for supplying and controlling the gas requires additional actuator systems (such as valves and/or pumps) as well as an additional periphery for the gas storage and feeding, etc. The presence of these components is a prerequisite in this patent. In addition, a very high temperature sensitivity must be expected because of the use of a gas.

The already miniaturized geometries and operating methods also include different types of tuning fork sensors for measuring the rate of rotation. They are known, for example, from European Patent Document EP 0 574 143 A1 (Lucas), Patent Document WO 93/05401 (Draper), German Patent Document DE 40 22 485 A1, Patent Document 92/01941 (Bosch) and German Patent Document DE 40 41 582 A1 (Bosch). In the case of all tuning fork sensors described therein, the prongs are excited to perform vibrations in parallel to the wafer plane. If the sensor system is entered into a rotated system of coordinates, this results in a bending of the prongs in a plane perpendicular to the excitation direction and/or a torsion of the prong suspension.

Patent Document WO 93/05401 (Draper), German Patent Document DE 40 22 485 A1, Patent Document WP 92/01941 (Bosch) and German Patent Document DE 40 41

582 A1 (Bosch) relate to twice (on both sides) suspended tuning fork sensors. It must therefore be expected that these sensors have a considerable temperature sensitivity. The electrostatic excitation of the prongs suggested in most of the embodiments as well as the read-out of the signal imply non-linearities which lead to considerable control expenditures. In the case of the embodiments of Patent Document WO 93/05401, a mechanically tension-free structuring also presents problems.

A tuning fork sensor which is suspended on one side and has a piezoresistive read-out of the torsion of the tuning fork suspension is known from European Patent Document EP 0574 143 A1 (Lucas). The tuning fork is excited electrostatically by way of an interdigital structure to perform vibrations in the wafer plane. Because of the low structural depth of the sensor element (perpendicularly to the wafer plane), the ensuring of the stiffness of the tuning fork base and of the prongs in this direction presents a problem here. However, this stiffness is required for implementing a signal read-out of the rate of rotation by way of the torsion of the tuning fork suspension.

It is an object of the invention to provide a miniaturized system which can be manufactured on a large scale at a reasonable price and which can be used for measuring the rate of rotation (angular velocity) of moved bodies in all areas of technology.

This object is achieved by providing a micromechanical rate of rotation sensor in the case of which parts made of silicon, silicon compounds or silicon/glass compounds or other semiconductor materials are structured out by micromechanical techniques, characterized in that the rate of rotation sensor has the form of a tuning fork (S) whose prongs (Z1, Z2) are situated in planes in parallel to the surface of the semiconductor wafers (OW, UW), in that these prongs (Z1, Z2) can be excited to carry out vibrations in a plane perpendicular to the wafer plane; and in that it has a sensor element (S) which measures the angular velocity of a rotation of the sensor about an axis in parallel to the tuning fork suspension.

The solution according to the invention leads to the following advantages:

The miniaturization can be advanced to a considerable degree since the solution is robust with respect to shock because of the low mass and the symmetrical construction, and saves costs, weight, space and energy.

By way of batch processes, the manufacturing method permits high piece numbers and a good reproducibility and is reasonable with respect to cost. The CMOS-compatible manufacturing also ensures the prerequisite for the monolithic integratability with the electronic sensor system or parts thereof as well as other suitable micromechanical components.

The monolithic integratability with the electronic sensor system or with parts thereof to form a robust rate of rotation sensor at reasonable cost, for example, with acceleration sensors to form micro-inertial components, is particularly advantageous.

Other special advantages of the suggested sensor geometry and of the corresponding sensor manufacturing process for the prongs in the wafer plane is the design freedom of the prongs, sufficient surface for the actuator system (such as a piezoelectric actuator system, a capacitive actuator system, etc.—see below), the precise manufacturing of the prong geometry in the wafer plane by using photolithographic processes, the highly accurate adjusting of the prong thickness by the utilization of buried etching stop layers while using SiliconOnInsulator material (manufactured, for example, by known BESOI or SIMOX processes) and the trimmability on the prong surface.

By the coupling to the torsion of the tuning fork suspension, the excitation movement is separated from the read-out movement.

An advantage in comparison to metal sensors and quartz sensors is the fact that the necessary hybrid-type integration of the quartz component with the electronic system does not permit a cost reduction potential of the manufacturing which is as high as that of the silicon sensors.

Other objects, advantages and novel features of the present invention will become apparent from the following detailed description of the invention when considered in conjunction with the accompanying drawings.

BRIEF DESCRIPTION OF THE DRAWINGS

FIGS. 9a–e are views of variants for the excitation, specifically
   a) thermomechanical (shape memory: analogous construction),
   b) magnetostrictive,
   c) electrostatic,
   d) electromagnetic in the homogenous B-field and
   e) electromagnetic in the inhomogeneous B-field.

DETAILED DESCRIPTION OF THE DRAWINGS

First, the operating principle is described by means of FIG. 1.

Figure 1A:
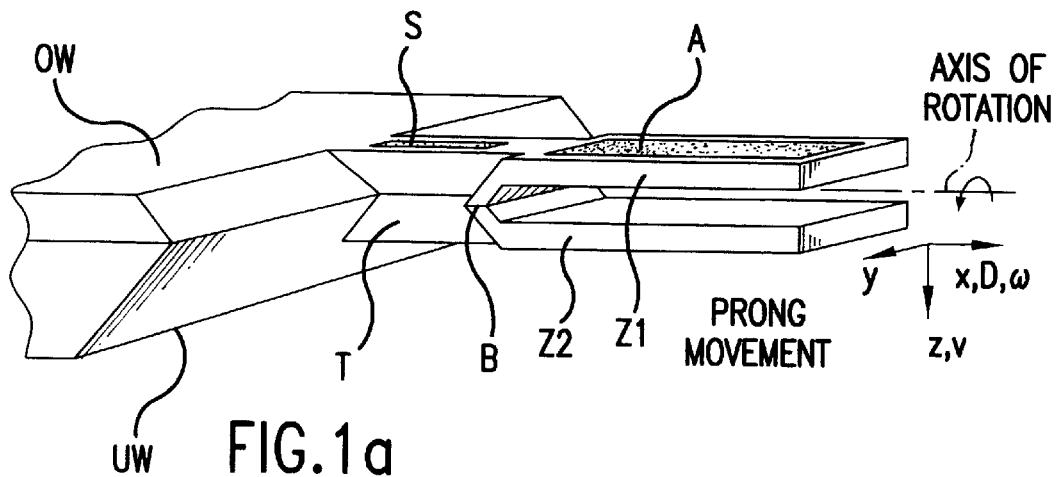
FIGS. 1a–c are three-dimensional representations of the first embodiment, specifically
   a) the basic diagram
   b) the representation of the excitation mode, and
   c) the representation of the read-out or torsion mode.
Figure 1B:
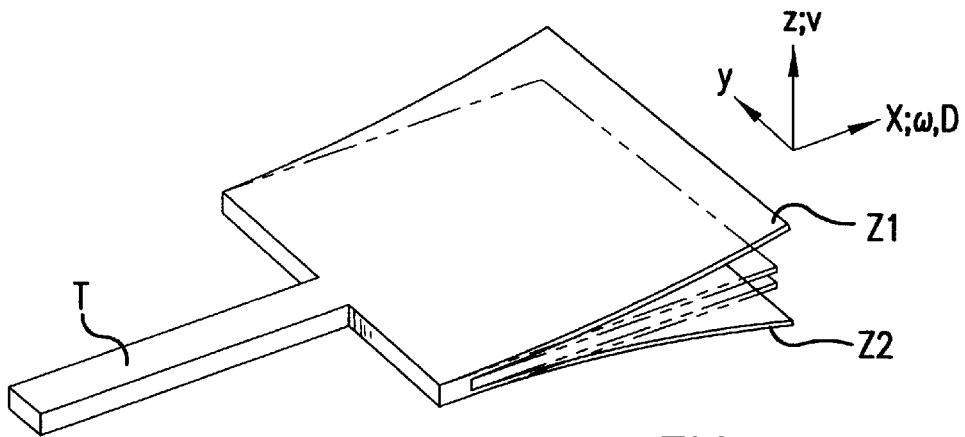
Figure 1C:
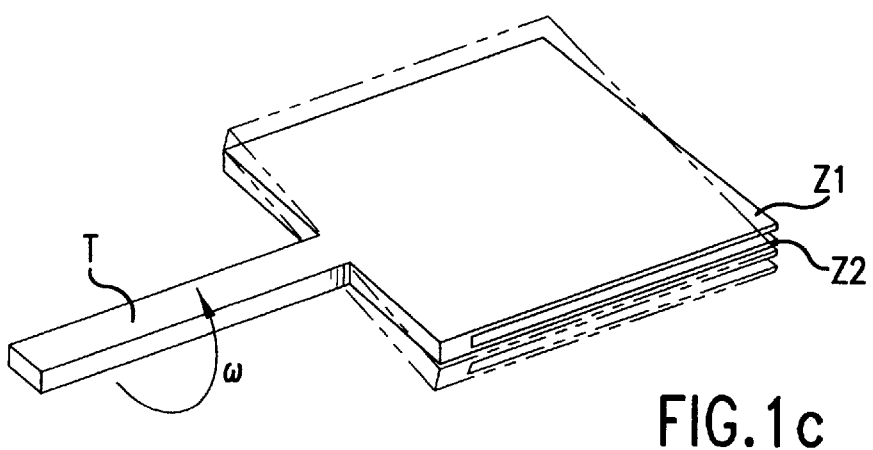
Figure 2:
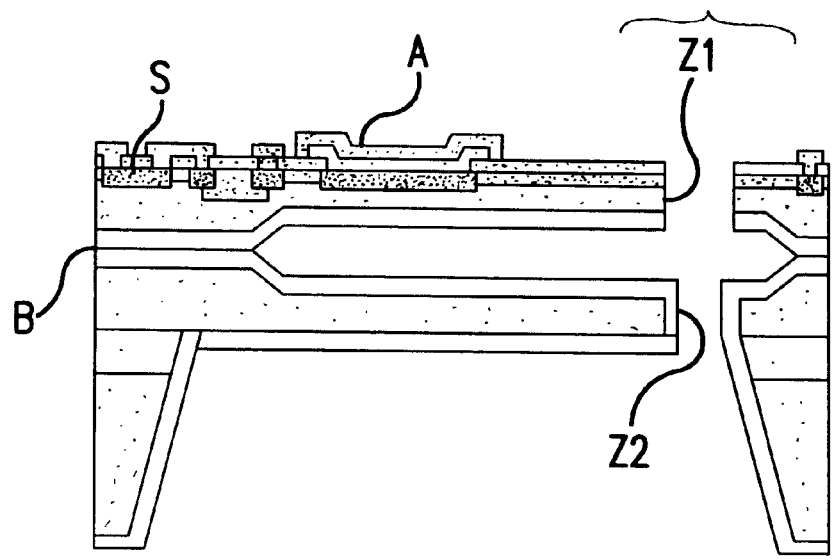
FIG. 2 is a schematic representation of the cross-section of the first embodiment in the variant A.

A possibility of measuring the angular velocity (rate of rotation), which is described in the following by means of the present sensor configuration, consists of the utilization of the Coriolis effect. FIGS. 1a–c show the geometry of the sensor and the basic operating principle in a very simplified form.

The sensor consists of a tuning fork S with double prongs Z1 and Z2 whose base point, the base B, hangs on a torsion bar T which, in turn, leads into a massive support structure which is formed by the upper wafer OW and the lower wafer UW. An actuator layer or an actuator element A for the prong excitation is applied to the upper prongs Z1 of the tuning fork S. The torsion bar T carries a sensitive layer S for the signal detection; that is, for the torsion measurement.

The basic prerequisite for utilizing the Coriolis effect is the excitation of a tuning fork vibration. The corresponding excitation mode or tuning fork mode is schematically illustrated in FIG. 1b. When the sensor, which vibrates in this manner, is entered into a system which rotates about the longitudinal axis of the torsion bar (x-axis) at a rotational speed ω, because of the opposite-phase vibration of the prongs Z1 and Z2, which takes place perpendicularly to the wafer surface (x-y plane), a torque D about the x-axis acts upon the structure. This periodic torque leads to a rotational vibration of the torsion bar T. The corresponding torsion mode or read-out mode is illustrated in FIG. 1c. The amplitude of the rotational vibration is directly proportional to the rate of rotation to be measured and to the velocity v of the prongs.

One of many possibilities of determining the rate of rotation ω, as indicated in FIG. 1a, consists of the piezoresistive measurement of the mechanical shearing strain induced by the rotational vibration in the torsion bar. In order to obtain a measuring signal which is as large as possible, the natural frequencies of the excitation mode and of the read-out mode must be coordinated with one another within the scope of a geometrical optimization. If possible, the excitation itself should take place in resonance. The quality (Q-factor) of the read-out mode should be as high as possible for reasons of a signal maximization. The rotating direction can be determined from the phase position of the torsional vibration.

In the following, a first embodiment will be described in two variants. The two variants differ in that, in the first variant A, the thickness of the tuning fork suspension is identical to the thickness of the tuning fork structure (FIGS. 1–4).

Figure 5:
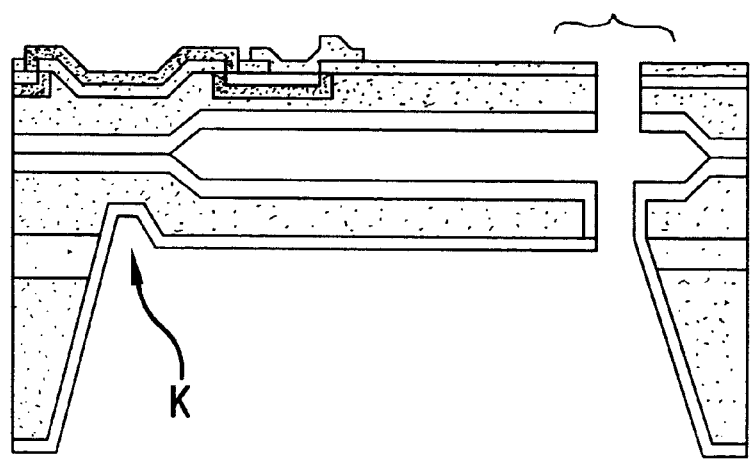
FIG. 5 is a schematic cross-sectional view of the first embodiment in the variant B.

In contrast, in the case of the variant B, the thickness of the tuning fork suspension is smaller than the thickness of the tuning fork structure; that is, a notching of the torsion bar T (FIG. 5) takes place.

Figure 3:
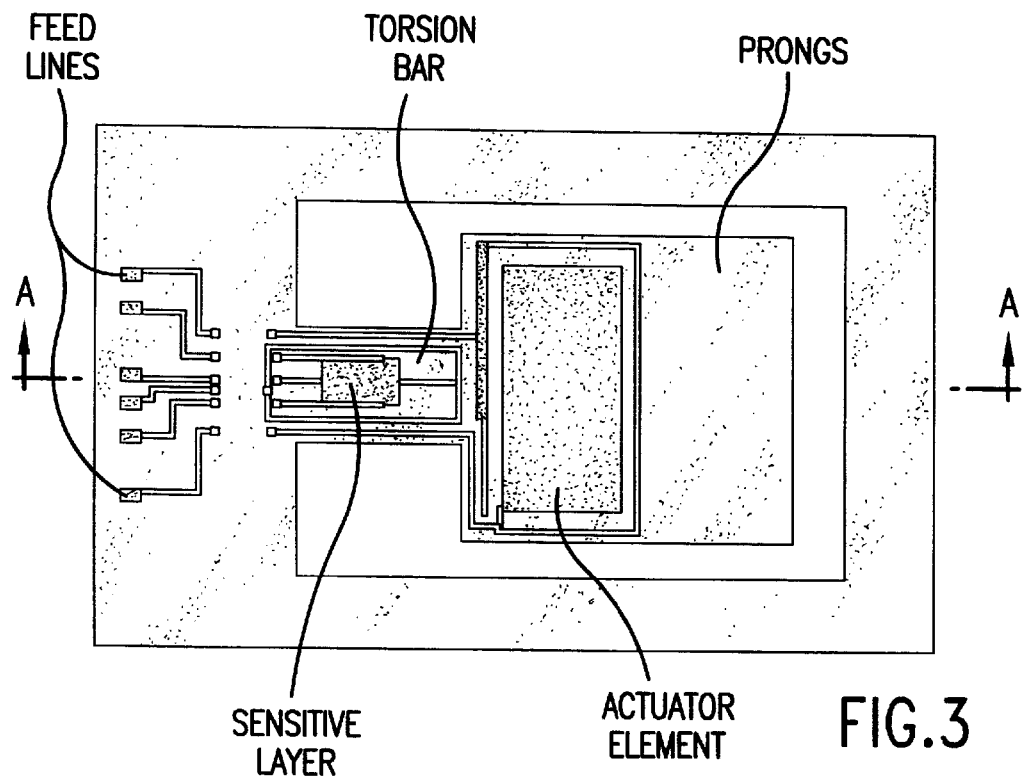
FIG. 3 is a schematic top view of the object of the invention.
Figure 4:
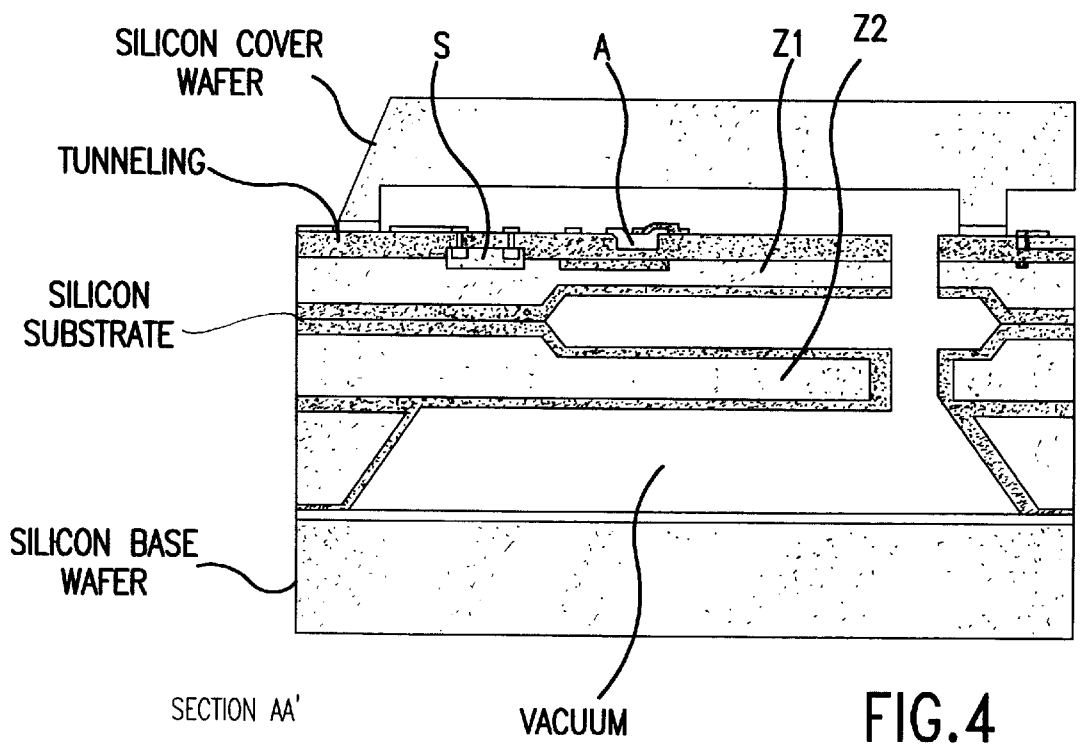
FIG. 4 is a schematic cross-sectional view A–A' of the object of FIG. 3.

Common characteristics are the following:

The tuning fork (sensor center part) consists of two Si-wafers. The construction is stacked of a base wafer and a cover wafer (made of silicon and/or glass) and is bonded to the center part in such a manner that the sensor cavity can be evacuated (FIG. 4). The bond frame is electrically tunneled in a vacuum-tight manner by a suitable doping profile in the bond frame area (FIG. 4). The excitation of one prong takes place by way of a piezoelectric thin layer A; for example, made of AlN, $ZnO_2$, PZT, or the like (FIGS. 1–4). The piezoelectric thin layer A is bonded on the bottom by way of doped silicon (FIG. 4) or an electrically conductive thin layer and is bonded on top by way of an electrically conductive thin layer. The read-out of the shearing strain on the surface of the torsion bar T (or of the suspension of the tuning fork) takes place piezoresistively. For this purpose, a four-sided bonding of the piezo resistor is required (FIG. 3). On the whole, the system operates as a resonant actuator-sensor system (FIG. 1).

Variants A and B have the following in common:

Manufacturing methods are used which are customary in the semiconductor industry and are state of the art, expanded by special micromechanical process steps on the basis of photolithographic full-wafer processing in the batch process.

Two silicon wafers, optionally with buried thin layers, are used as the starting material which are suitable for an etching stop during wet-chemical anisotropic etching. Preferably, monocrystalline silicon (possibly also polysilicon), called SOI, with a freely selectable but symmetrical thickness in all doping types and doping concentrations, preferably (100)-silicon, is used.

Figure 6:
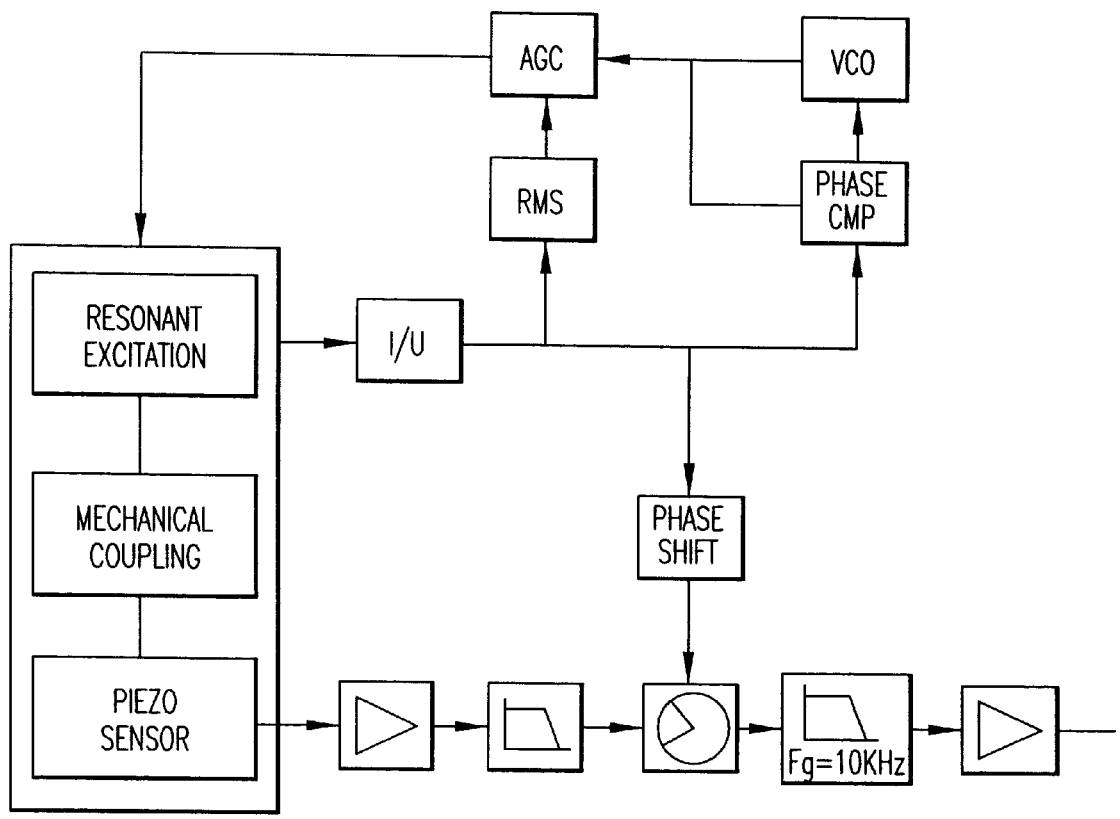
FIG. 6 is a block diagram for evaluating the first embodiment.

By means of a block diagram, FIG. 6 illustrates a read-out principle suggested according to the invention for the combination of the piezoelectric excitation and the piezoresistive read-out.

So that a resonant excitation with a constant amplitude of the prongs Z1 and Z2 is achieved, the difference of phase between the current and the voltage in the case of a compensated self-capacitance as well as stray capacitance of the piezoelectric layer must be equal to 0°. This can be achieved, for example, by a phase comparator with frequency control of a voltage-controlled oscillator (VCO). A second possibility consists of the switching into the feedback branch in an oscillatory system. The amplitude stability of the prongs Z1 and Z2 is ensured by the follow-up of the piezovoltage as a function of the piezocurrent. After a pre-amplification and a band pass filtering, the output signal of the piezoresistive sensor is multiplied with the excitation signal of the prongs which was phaseshifted by 90°. By means of the phase-synchronous rectification, it is possible to avoid the mechanical crosstalk of the sensor. A low-pass filter for a band limitation is connected behind the multiplier. As required, it is possible to design the sensor as a captive version. As a result, the sensitivity and the resolution can be increased.

In the following, additional variants of the object of the invention will be suggested.

As far as the starting material is concerned, the used silicon wafers can also be supplemented by an epitaxial growth of silicon. As an alternative to the indicated materials, buried p/n-transitions may also be used as the "electrochemical etching sto".

Figure 10A:
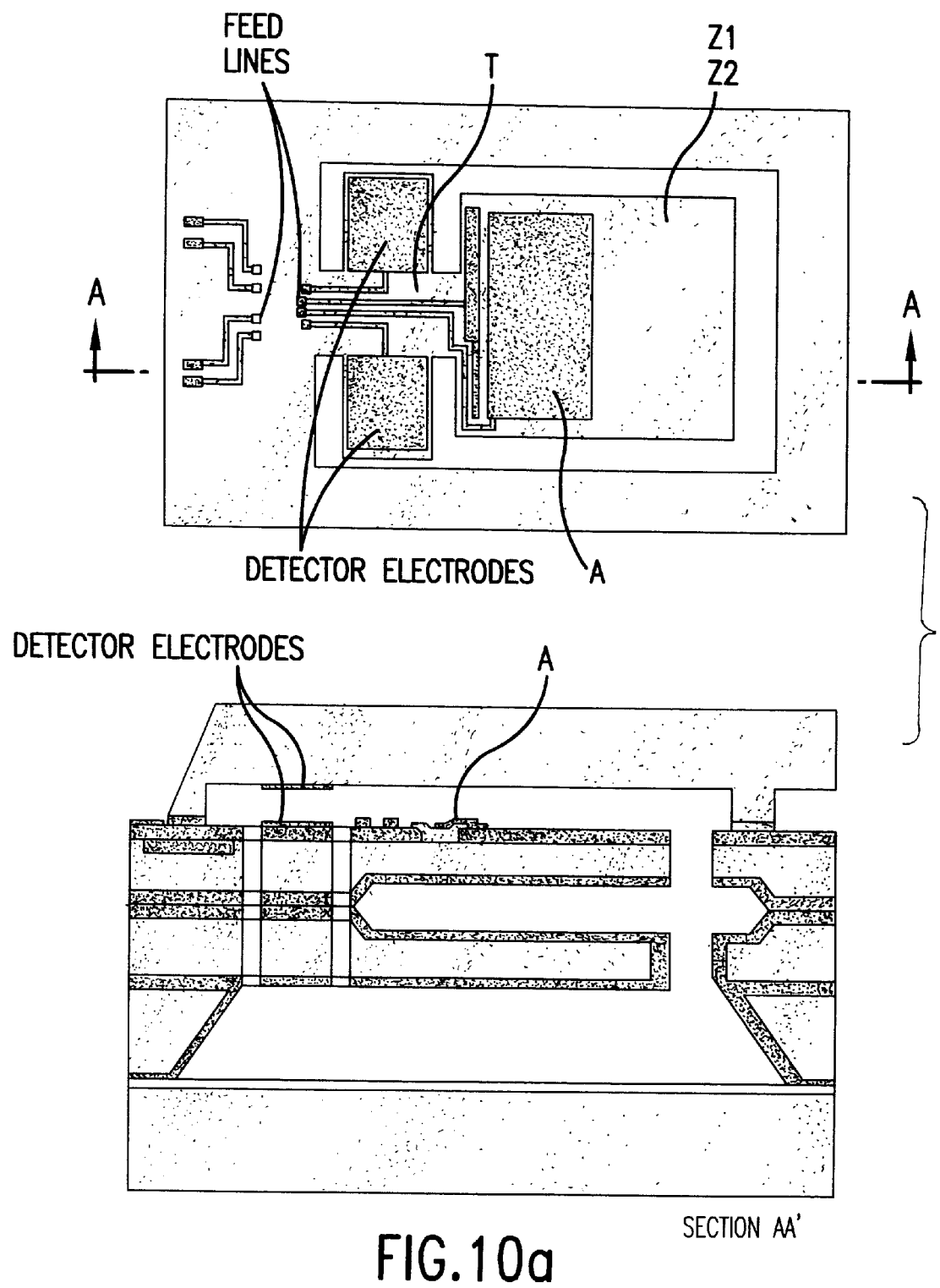
FIGS. 10a–c are views of variants of the read-out mechanism, specifically,
   a) electrostatic,
   b) optical (interferometer) and
   c) piezoelectric.

With respect to the geometry, as an alternative to the described plate-shaped rectangular construction of the prongs, in addition, wing structures or extension arms can be used for the targeted damping or for the electrostatic excitation/read-out, as illustrated, for example, in FIG. 10a.

Figure 7A:
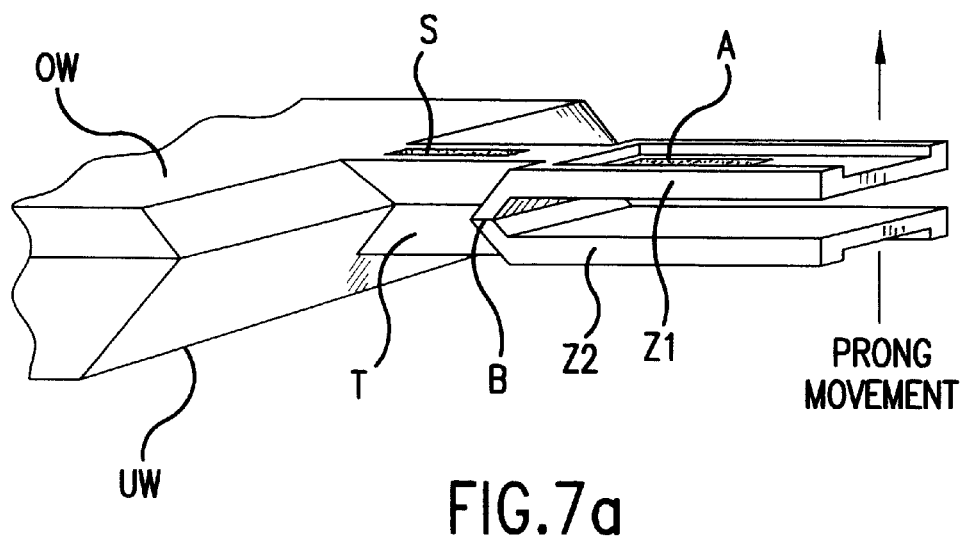
FIGS. 7a–c are views of constructive variants for the geometry for optimizing the coordination, specifically
   a) the U-section
   b) the hollow section of the torsion bar
   c) the prongs with the trimming mass.
Figure 7B:
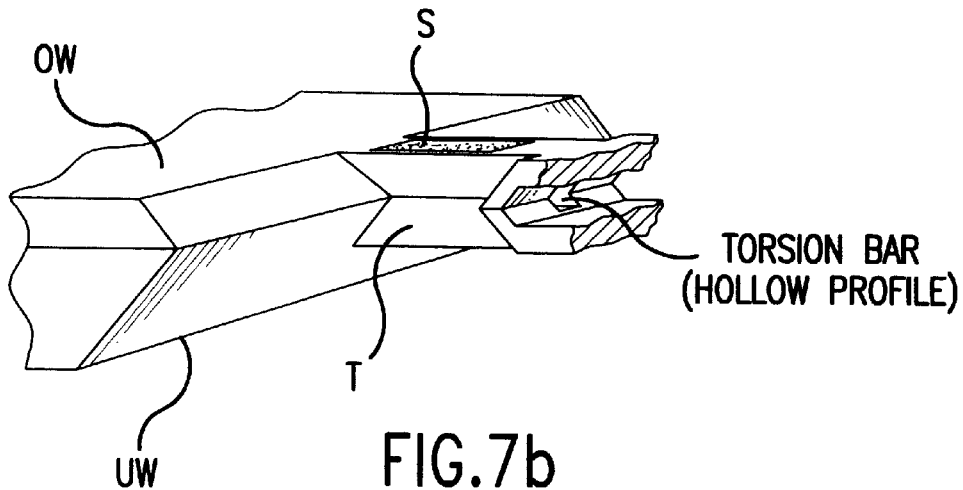
Figure 7C:
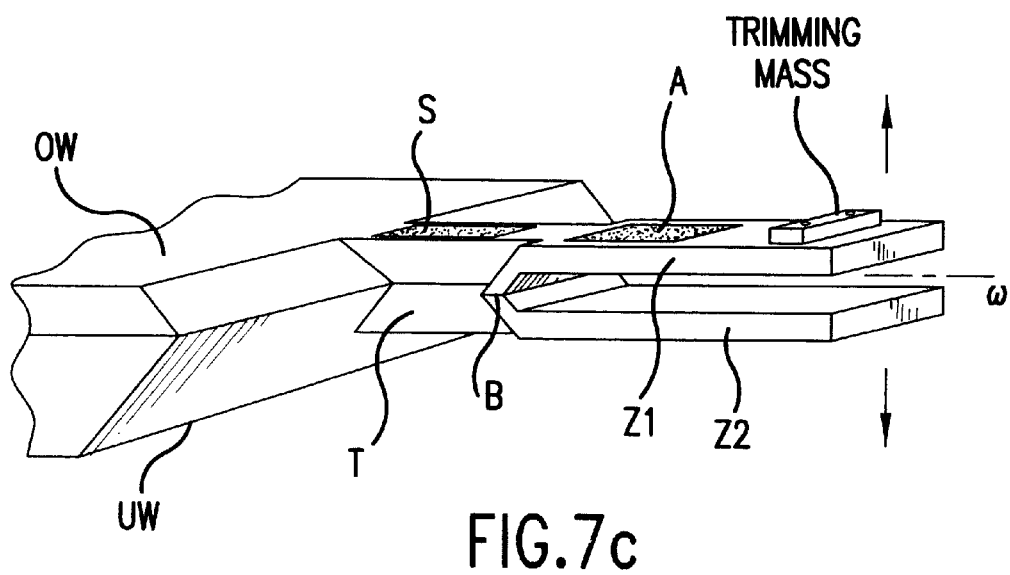

Additional constructive measures can be taken for fixing or changing the frequencies and mode types of the torsion bar and of the prongs corresponding to FIGS 7a–c, specifically with respect to the geometry of the prongs and of the torsion bar or deviating from the rectangular shape in the wafer plane, for example, in a fork-shaped geometry.

Thus, the prongs may also be constructed with a defined profile, such as a U-profile according to FIG. 7a, a hollow profile, an H-profile or the like.

In addition, the cross-section of the torsion bar T may, for example, as illustrated in FIG. 7b, be constructed as a hollow profile. Also the geometry, particularly the length, of the tuning fork base, can be adapted to the given characteristics of the material.

Also, corresponding to FIG. 7c, a tuning fork prong can be provided with a mass M for a later trimming.

The mechanical crosstalk can be minimized by the suitable placing of the piezoresistive element on the torsion bar. Furthermore, by the application of one or several piezoresistors, which utilize the longitudinal or transversal PR-effect for measuring the bending stress in the suspension of the tuning fork, the mechanical crosstalk can be measured.

Figure 8A:
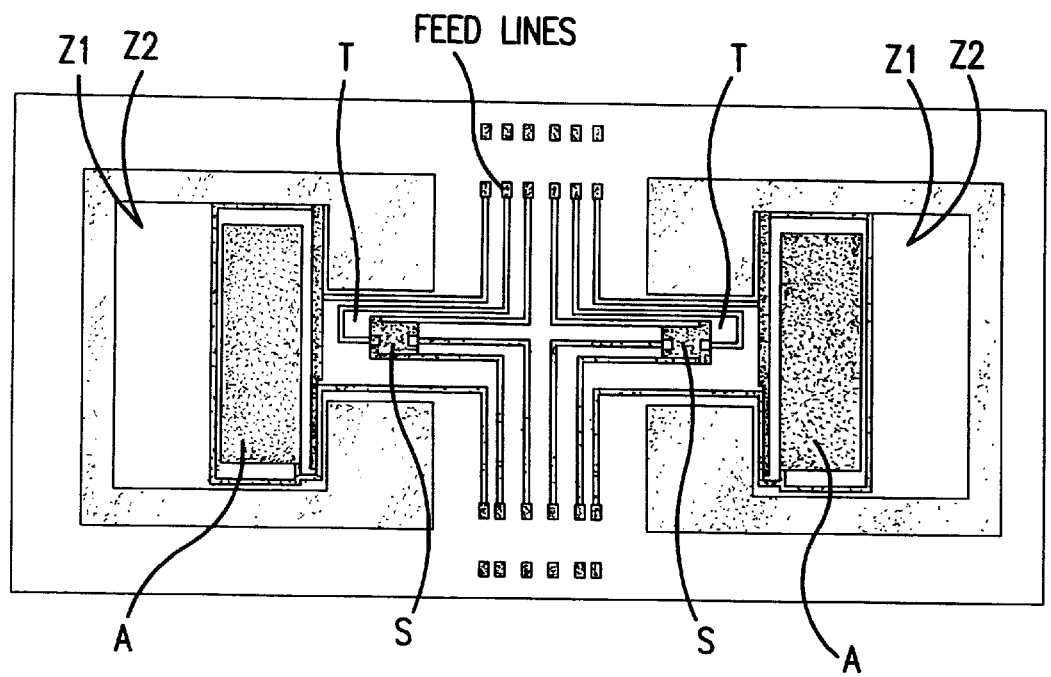
FIGS. 8a–b are views of variants for forming differential signals, specifically
   a) the opposed arrangement in two etching pits and
   b) the opposed arrangement in one etching pit.
Figure 8B:
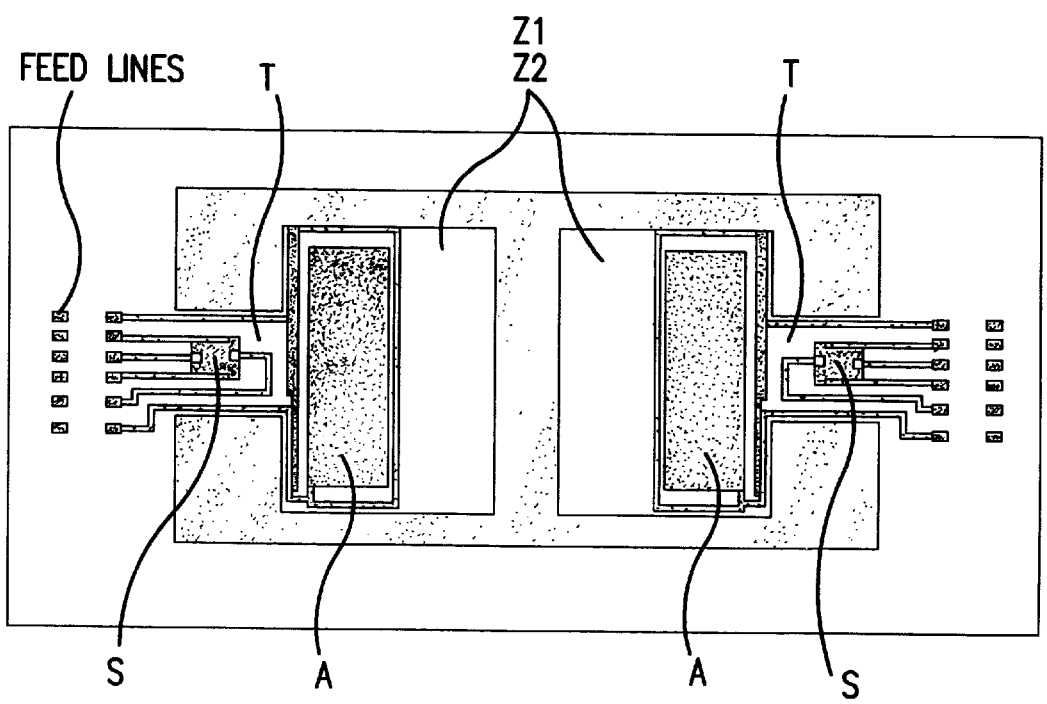

Finally, several sensor elements can be used for forming difference signals, such as an offset signal, as shown in FIGS. 8a and 8b.

Different variants can also be used for the excitation and read-out mechanisms.

Figure 9C:
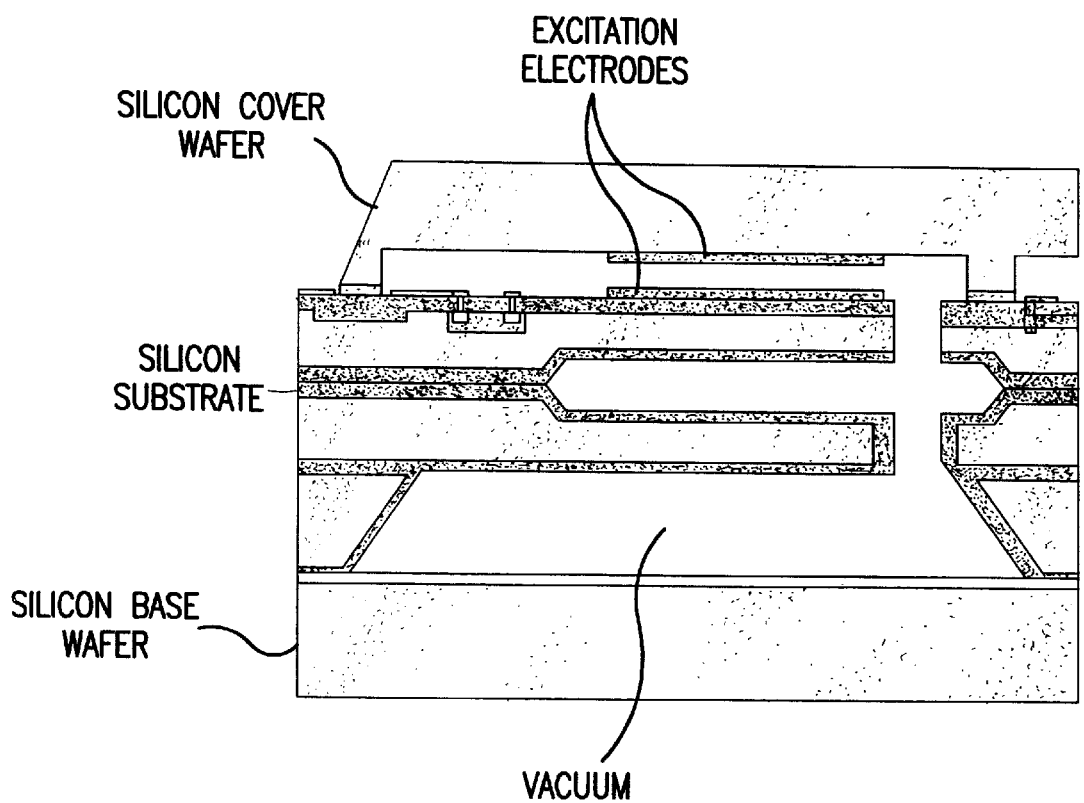

According to FIG. 9a, the thermomechanical excitation may take place by way of implanted resistors or thin-layer resistors. FIG. 9b shows a magnetic excitation by way of a magnetostrictive thin layer TbFe, SmFe (TbDy)Fe. An electrostatic excitation according to FIG. 9c with excitation electrodes is also possible.

Figure 9D:
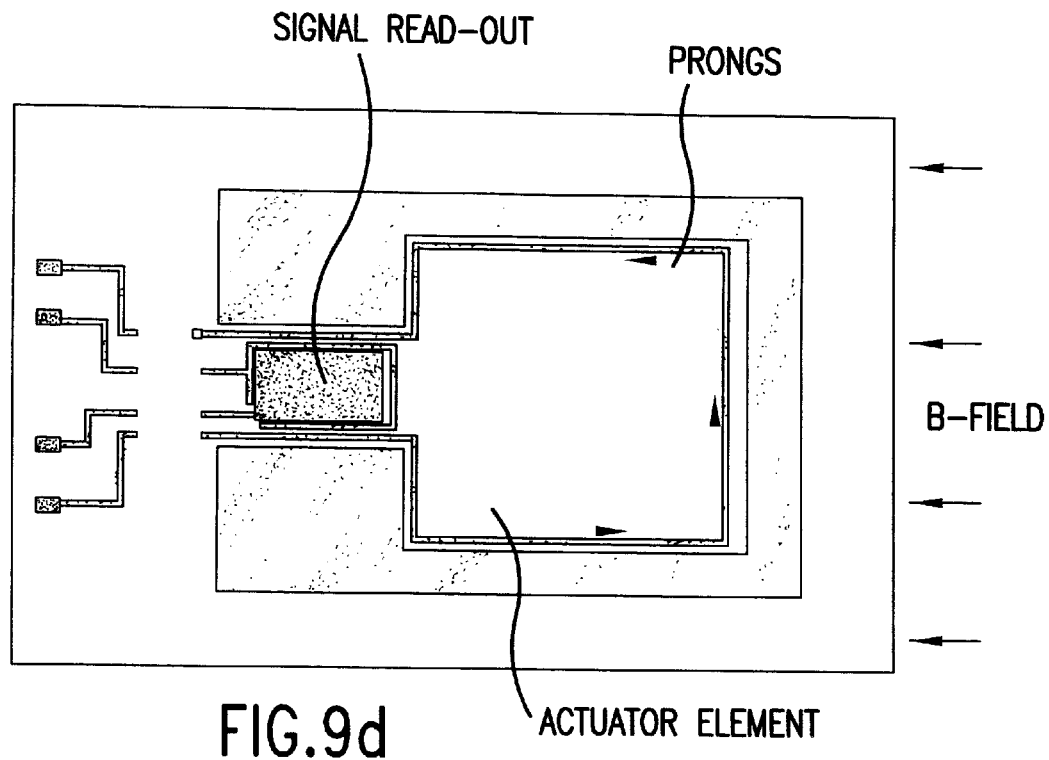
Figure 9E:
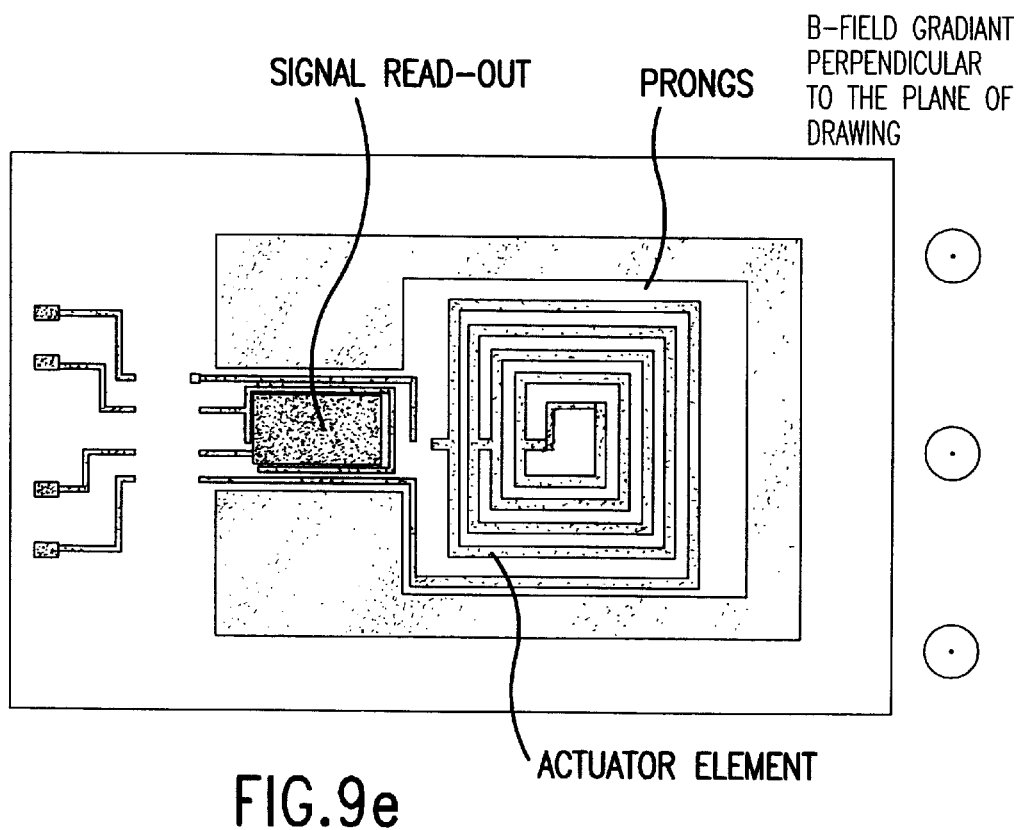

FIG. 9d shows an electromagnetic excitation, for example, by way of a conductor loop in the homogeneous magnetic field, and FIG. 9e shows an electromagnetic excitation, for example, by way of a coil in the inhomogeneous magnetic field in parallel to the prong movement. Finally, shape memory materials in an arrangement according to FIG. 9a can also be used.

In addition, all used actuator thin layers can in each case be applied to one or both prongs of the tuning fork.

Also, in the case of the read-out, several embodiments are possible which are illustrated in FIGS. 10a–d.

Thus, the read-out according to FIG. 10a can take place electrostatically. For this purpose, additional "wing surfaces" are useful.

Figure 10B:
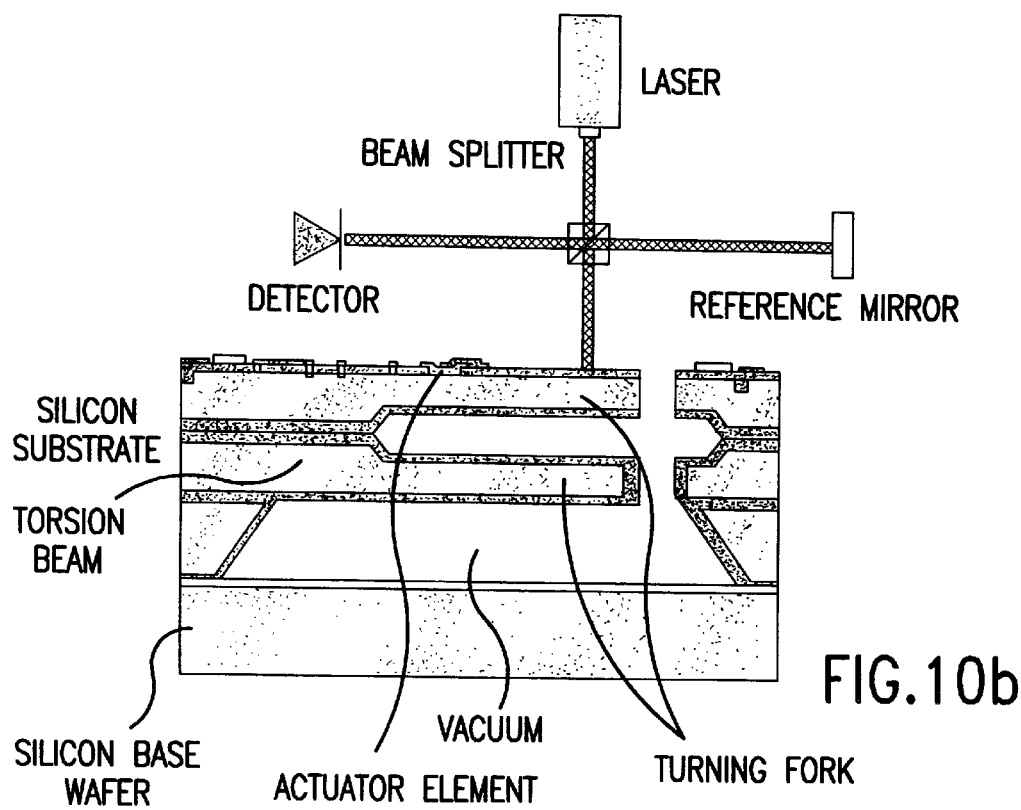

In addition, the read-out can take place optically, specifically, for example, by means of a reflecting layer and a beam deflection angle, or by means of a layer whose optical characteristics depend on the mechanical tension in the layer or by a layer which, corresponding to FIG. 10b, is a component of a Michelson interferometer.

Figure 10C:
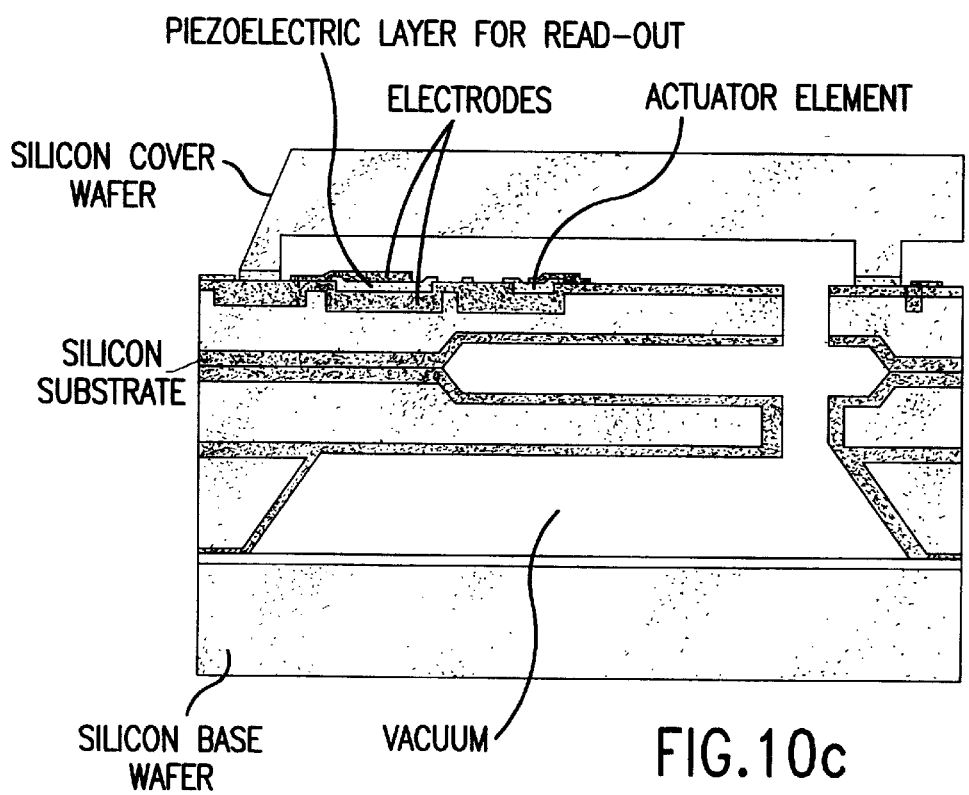

Finally, according to FIG. 10c, a piezoelectric read-out is possible.

In principle, it is possible to design each of the mentioned embodiments also as a captive sensor. Concerning the captivity, it is generally true that the torsional movement is compensated by counteracting forces. The correcting variable will then be proportional to the measured variable. In the case of this process, a higher sensitivity and resolution can be achieved than in the case of non-captive sensors. This force compensation can be carried out directly in the case of the electrostatic (FIG. 10a) as well as in the case of the piezoelectric (FIG. 10b) embodiment since the described sensitive elements can immediately also be used as adjusting elements. In the case of the remaining embodiments, the required adjusting elements are supplemented correspondingly.

By means of FIGS. 11a–d, several integration variants are introduced.

Figure 11A:
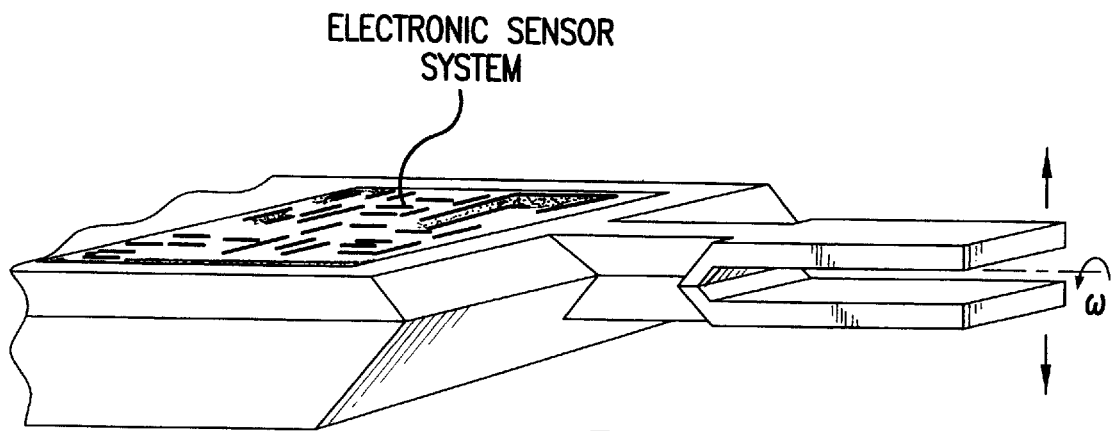
FIGS. 11a–d are views of variants of the monolithic integration (particularly rate of rotation sensor and acceleration sensor with the sensitive direction perpendicularly to the wafer surface, specifically
   a) rate of rotation sensor with electronic signal processing system,
   b) two rate of rotation sensors for different axes,
   c) a rate of rotation sensor and an acceleration sensor, and
   d) two rate of rotation sensors and two acceleration sensors.
Figure 11B:
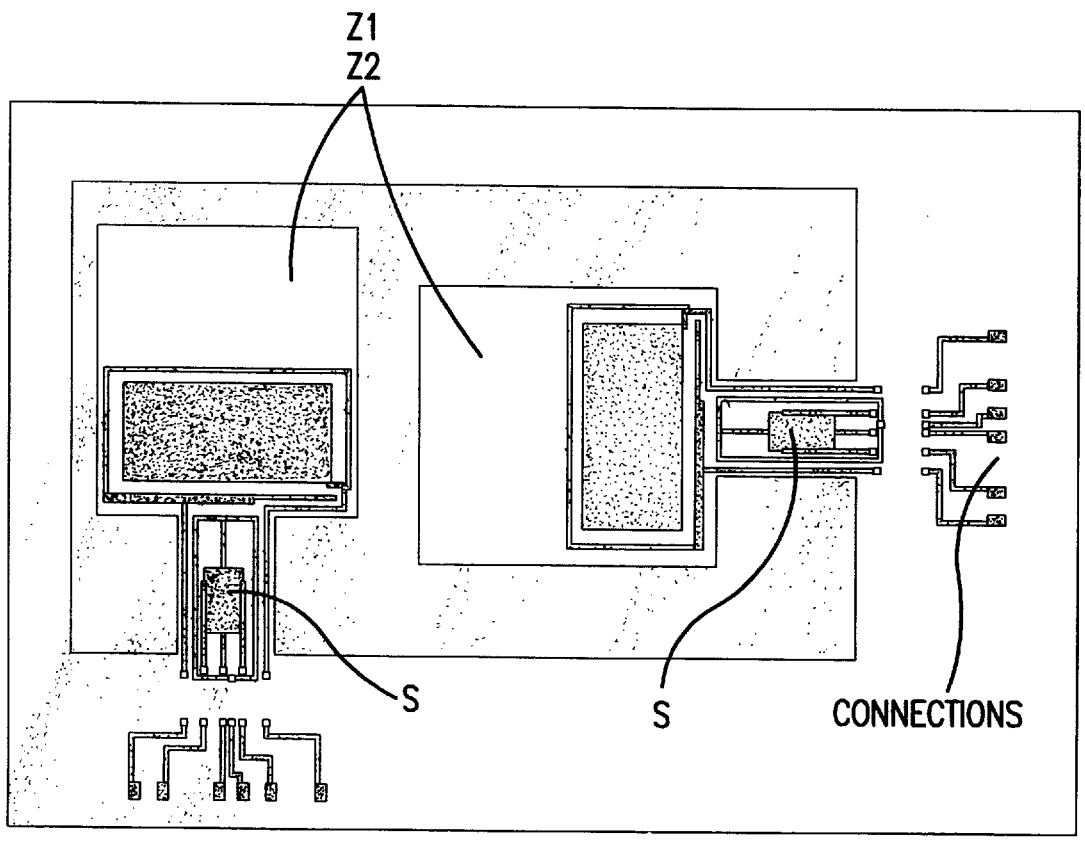
Figure 11C:
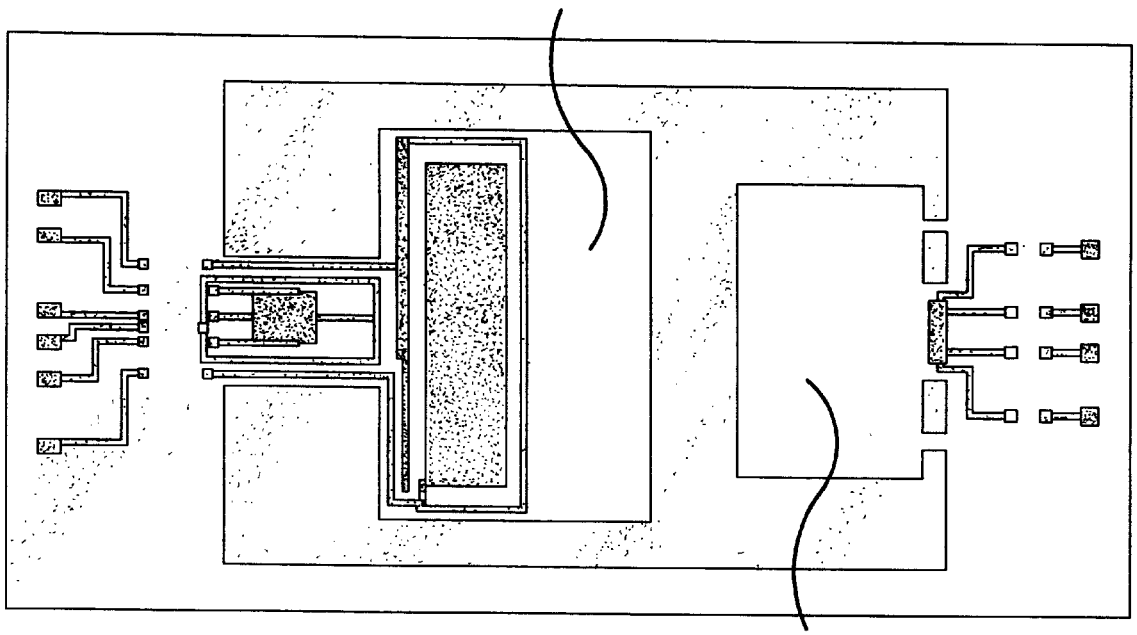

Thus, according to FIG. 11a, the electronic sensor system or parts of the electronic system may be integrated on the chip together with the rate of rotation sensor. In the embodiment according to FIG. 11b, at least two rate of rotation sensors are integrated for the simultaneous measuring of several components of the angular velocity. In the case of another embodiment according to FIG. 11c, a rate of rotation sensor 1 and at least one acceleration sensor (BS) are integrated on the same chip. In this case, the acceleration sensor may be arranged with the sensitive direction in the wafer plane or perpendicularly to the wafer plane. An integrated microsystem of this type can be used, for example, in an anti-skid system for measuring the yaw rate and the lateral acceleration.

Figure 11D:
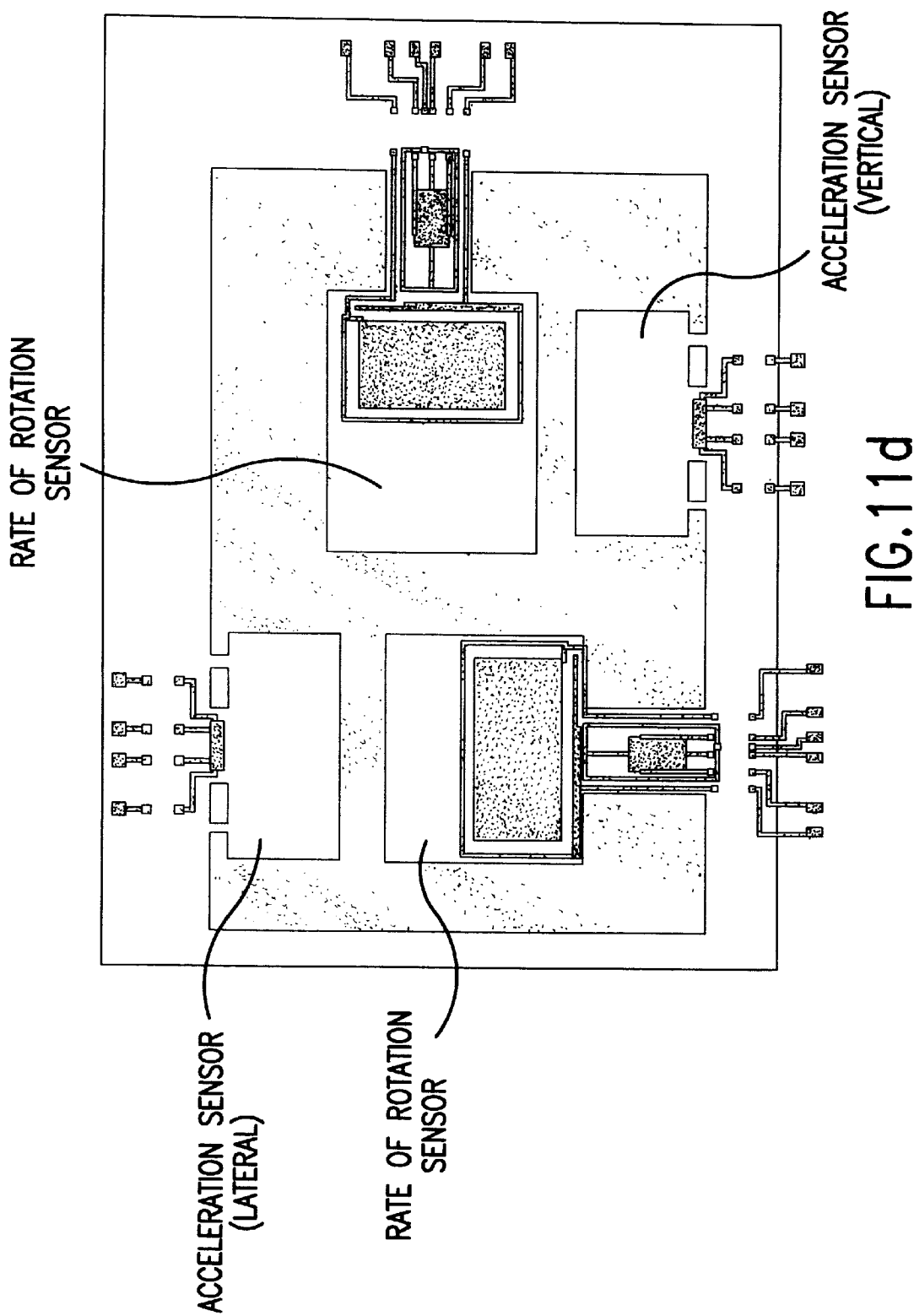

In FIG. 11d, the micro system consists of at least two rate of rotation sensors and at least two acceleration sensors as well as the pertaining electronic system for the precise determination of the two components of the angular velocity and of the acceleration in the wafer plane as well as of the acceleration perpendicularly thereto.

By optimizing the geometry, the natural frequencies of the excitation mode and of the read-out mode are fixed such that they are outside the disturbance spectrum relevant to the application field of the sensor. Within the scope of a frequency-selective measurement according to the lock-in principle, an increased insensitivity with respect to lateral accelerations will therefore occur.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Micromechanical rate of rotation sensor in which parts made of silicon, silicon compounds or silicon/glass compounds or other semiconductor materials are structured out by micromechanical techniques, said rotation sensor comprising:

at least one semiconductor wafer defining a wafer plane;

a pair of prongs forming a tuning fork, said prongs defining respective planes parallel to the wafer plane, said prongs extending from a common base, said prongs being aligned with each other and spaced apart from each other in a direction perpendicular to said wafer plane, said prongs being excitable to vibrate in a plane perpendicular to the wafer plane;

a tuning fork suspension extending between said common base of the prongs and the at least one semiconductor wafer; and a sensor element which measures the angular velocity of a rotation of the sensor about an axis parallel to the tuning fork suspension.

2. Rate of rotation sensor according to claim 1, characterized in that the sensor element registers the torsion of the tuning fork suspension.

3. Rate of rotation sensor according to claim 2, characterized in that the sensor element is made of monocrystalline Si.

4. Rate of rotation sensor according to claim 2, characterized in that the sensor element consists of micromechanically structurable materials selected from the group consisting of poly-Si, SiC, silicon nitride, silicon dioxide, GaAs, quartz, AlN, PZT and metals.

5. Rate of rotation sensor according to claim 3, characterized in that the tuning fork consists of two silicon wafers optionally with buried thin layers which are situated between a base wafer and a cover wafer, and in that the parts are bonded such that a cavity surrounding the tuning fork can be evacuated.

6. Rate of rotation sensor according to claim 1, characterized in that an excitation of a prong of the tuning fork takes place by way of a piezoelectric thin layer, said tuning fork suspension comprises a torsion bar, and a read-out of shearing strain of the torsion bar takes place piezoresistively.

7. Rate of rotation sensor according to claim 1, characterized in that the tuning fork suspension comprises a torsion bar, a cross-section of the torsion bar being constructed as a hollow profile.

8. Rate of rotation sensor according to claim 1, characterized in that a cross-section of at least one of said prongs has a U-shaped profile.

9. Rate of rotation sensor according to claim 1, characterized in that at least one of said prongs is provided with a trimming mass.

10. Rate of rotation sensor according to claim 1, characterized in that the excitation of a prong of the tuning fork takes place thermomechanically by way of implanted heating resistors or thin-layer resistors.

11. Rate of rotation sensor according to claim 1, characterized in that an excitation of at least one of said prongs of the tuning fork takes place magnetically by way of a magnetostrictive thin layer.

12. Rate of rotation sensor according to claim 1, characterized in that an excitation of at least one of said prongs of the tuning fork takes place electrostatically by means of exciting electrodes.

13. Rate of rotation sensor according to claim 1, characterized in that an excitation of at least one of said prongs of the tuning fork takes place electromagnetically by way of a conductor loop in a magnetic field.

14. Rate of rotation sensor according to claim 1, characterized in that the tuning fork suspension comprises a torsion bar, and a read-out of shearing strain of the torsion bar takes place electrostatically.

15. Rate of rotation sensor according to claim 1, characterized in that the tuning fork suspension comprises a torsion bar, and a read-out of shearing strain of the torsion bar takes place optically by way of a reflecting layer and a deflection of a beam.

16. Rate of rotation sensor according to claim 15, characterized in that the reflecting layer is a component of an interferometer.

17. Rate of rotation sensor according to claim 1, characterized in that the tuning fork suspension comprises a torsion bar, and a read-out of shearing strain of the torsion bar takes place piezoelectrically.

18. Rate of rotation sensor according to claim 1, characterized in that at least parts of an electronic control or read-out system are integrated on a chip with the rate of rotation sensor.

19. Rate of rotation sensor according to claim 1, characterized in that the sensor is integrated on a chip with at least one additional rate of rotation sensor.

20. Rate of rotation sensor according to claim 1, characterized in that the sensor is integrated on a chip with at least one acceleration sensor (BS).

21. Rate of rotation sensor according to claim 1, characterized in that the sensor is integrated on a chip with at least one acceleration sensor (BS) and one rate of rotation sensor (DRS).

22. Rate of rotation sensor according to claim 1, characterized in that the thickness of the tuning fork suspension is identical to the thickness of the tuning fork.

23. Rate of rotation sensor according to claim 1, characterized in that the thickness of the tuning fork suspension is smaller than the thickness of the turning fork.

24. Rate of rotation sensor according to claim 1, characterized in that with respect to torsion the sensor is constructed as a captive sensor.

* * * * *